United States Patent
Reynolds

(10) Patent No.: US 12,081,816 B1
(45) Date of Patent: Sep. 3, 2024

(54) SYSTEM AND METHODS FOR SOCIAL ADS AND PREMIUM UPGRADES FOR MULTI-ACCOUNT WATCH PARTIES

(71) Applicant: Adeia Guides Inc., San Jose, CA (US)

(72) Inventor: Jennifer Reynolds, Sugar Hill, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/126,633

(22) Filed: Mar. 27, 2023

(51) Int. Cl.
*H04N 21/258* (2011.01)
*H04N 21/254* (2011.01)
*H04N 21/2668* (2011.01)
*H04N 21/472* (2011.01)

(52) U.S. Cl.
CPC ..... *H04N 21/25808* (2013.01); *H04N 21/254* (2013.01); *H04N 21/2668* (2013.01); *H04N 21/472* (2013.01)

(58) Field of Classification Search
CPC ........... H04N 21/25808; H04N 21/254; H04N 21/2668; H04N 21/472
See application file for complete search history.

(56) References Cited

U.S. PATENT DOCUMENTS

| | | | | |
|---|---|---|---|---|
| 2013/0196615 A1* | 8/2013 | Zalmanovitch | ... | H04M 15/7652 455/405 |
| 2023/0147705 A1* | 5/2023 | Huertas | ............... | H04L 67/1095 709/248 |

OTHER PUBLICATIONS

"The 9 best ways to host a remote watch night," [retrieved on Apr. 25, 2023 from URL: https://www.polygon.com/21295526/how-to-watch-movies-with-friends-together-online-netflix-party-hulu-kast-disney-plus-watch2gether] (11 pages).
"Tumblr-Blog," [retrieved on Apr. 25, 2023 from URL: https://lifehacker.com/why-your-hulu-watch-party-might-still-have-ad-breaks-1845801875] (10 pages).
"Why Your Hulu Watch Party Might Still Have Ad Breaks," [retrieved on Apr. 25, 2023 from URL: https://lifehacker.com/why-your-hulu-watch-party-might-still-have-ad-breaks-1845801875] (4 pages).

* cited by examiner

*Primary Examiner* — Kunal Langhnoja
(74) *Attorney, Agent, or Firm* — Haley Guiliano LLP

(57) ABSTRACT

Systems and methods are provided for enabling an enhanced group watch session. A group session for consuming a first media content item is initiated between first and second computing devices, and a first portion of the first media content item is received at the computing devices. It is identified, based on a first user profile, that the first computing device is configured to receive a second media content item at a first time, and it is identified, based on a second user profile, that the second computing device is configured to not receive a second media content item at the first time. A first user interface element associated with performing an action is generated for output, and a first input associated with the user interface element is received. The action is performed at the second computing device.

16 Claims, 17 Drawing Sheets

SYSTEM AND METHODS FOR SOCIAL ADS AND PREMIUM UPGRADES FOR MULTI-ACCOUNT WATCH PARTIES

BACKGROUND

One or more disclosed embodiments are directed towards systems and methods for enabling an enhanced group watch session. In particular, systems and methods are provided herein that enable an action to be performed during a group watch session. Some embodiments or aspects relate to additional or alternative features, functionalities, or fields.

SUMMARY

With the proliferation of over the top (OTT) content providers, such as Netflix, Prime Video and Paramount+, individuals are consuming more content on demand than ever before. However, many users enjoy the social aspect of consuming a content item with family and/or friends, so they may consume content via a group session, or watch party. In such a group session, multiple users consume the same content item at the same time, or substantially the same time. However, if some users in the group are subscribed to a premium OTT package, and some users in the group are not, the premium users may receive a blank screen during an advertisement break for the non-premium users. This is to maintain synchronicity between users; however, it leads to a sub-par experience for the premium users as they are receiving no content. Further, the premium users may feel left out if the non-premium users end up discussing, for example, a funny advertisement.

To overcome these problems, systems and methods are provided herein that enable an enhanced group watch session.

Systems and methods are described herein for enabling an enhanced group watch session. In accordance with some aspects of the disclosure, a method is provided. The method includes initiating a group session for consuming a first media content item between a first computing device and a second computing device, and receiving a first portion of the first media content item at the first computing device and the second computing device. It is identified, based on a first user profile, that the first computing device is configured to receive a second media content item at a first time, and it is identified, based on a second user profile, that the second computing device is configured to not receive the second media content item at the first time. A first user interface element associated with performing an action is generated for output, and a first input associated with the first user interface element is received. The action is performed at the second computing device.

In an example system, a group watch session may comprise premium users who do not receive advertisements, and non-premium users who do receive advertisements. In order to ensure that the group session remains synchronized, premium users may typically be presented with a blank screen. In order to mitigate this, premium users are given an option to perform an action, such as watch exclusive content, receive an interactive content item, such as a game, and/or receive an advertisement.

The second media content item may be an advertisement. Identifying that the first computing device is configured to receive the second media content item at the first time may further comprise identifying that the first user profile is subscribed to a media package comprising one or more advertisements. Identifying that the second computing device is configured to not receive the second media content item at the first time may further comprise identifying that the second user profile is subscribed to a premium media package. A second user interface element associated with upgrading the first user profile to the premium package may be generated for output at the first computing device. A second input associated with the second user interface element may be received, and a second portion of the first media content item may be received in place of the advertisement at the first computing device. Upgrading the first user profile to the premium package may further comprise receiving an updated manifest file at the first computing device.

The action may comprise generating no media content for output, generating the second media content item for output, requesting a third media content item, and/or generating an interactive media item for output.

A user interface associated with a first chat room may be generated for output at the first and second computing devices, and the user interface and the first media content item may be generated for concurrent output. The first computing device may be moved from the first chat room to a second chat room in response to receiving the second media content item at the first computing device.

One or more metrics may be collected at the first computing device and/or the second computing device. The collected metrics may be transmitted from the first computing device and/or the second computing device to a server associated with a provider of the first media content item.

A third computing device may be identified, wherein the third computing device may be associated with the second user profile. Generating the first user interface element associated with performing an action may further comprise generating the first user interface element for output at the third computing device. A fourth computing device may be identified, wherein the fourth computing device may be associated with the second user profile. The second media content item may be an advertisement. Identifying that the first computing device is configured to receive the second media content item at the first time may further comprise identifying that the first user profile is subscribed to a media package comprising one or more advertisements. Identifying that the second computing device is configured to not receive the second media content item at the first time may further comprise identifying that the second user profile is subscribed to a premium media package. A second user interface element associated with upgrading the first user profile to the premium package may be generated for output at the fourth computing device. A second input associated with the second user interface element may be received at the fourth computing device. A second portion of the first media content item may be received at the first computing device in place of the advertisement. The second portion of the first media content item may be received at the second computing device.

Identifying that the first computing device is configured to receive the second media content item at the first time may further comprise identifying that the first user profile is subscribed to a media package comprising one or more advertisements. Identifying that the second computing device is configured to not receive the second media content item at the first time may further comprise identifying that the second user profile is subscribed to a premium media package. The action may comprise upgrading the first user profile from the media package comprising one or more advertisements to the premium package.

A time period associated with the second media content item may be identified, and the duration of the action may be limited to the identified time period.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
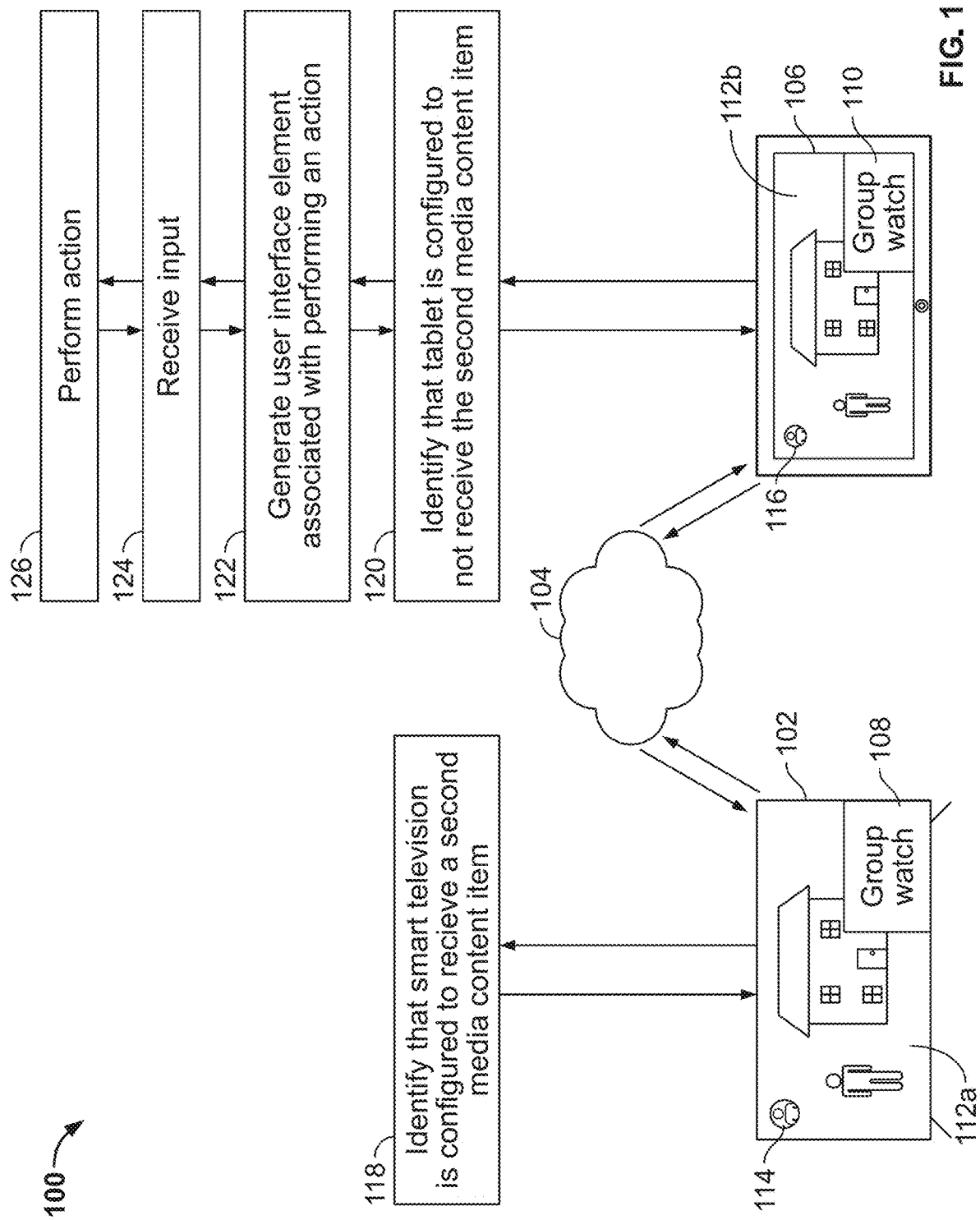
FIG. 1 shows an example environment for enabling an enhanced group watch session, in accordance with some embodiments of the disclosure.

A media content item, or content item, includes audio, video, text, a video game and/or any other media content. A content item may be a single media item. In other examples, it may be a series (or season) of episodes of content items. Audio includes audio-only content, such as podcasts. Video includes audiovisual content such as movies and/or television programs. Text includes text-only content, such as event descriptions. One example of a suitable media content item is one that complies with the MPEG DASH standard. An over-the-top (OTT), streaming and/or video on demand (VOD) service (or platform) may be accessed via a website and/or an app running on a computing device, and the device may receive any type of content item, including live content items and/or on-demand content items. Content items may, for example, be streamed to physical computing devices. In another example, content items may be streamed to virtual computing devices in, for example, an augmented environment, a virtual environment and/or the metaverse.

A group session, group watch, group watch session, or watch party, enables a content item to be received and output at participating computing devices at the same time, or substantially the same time. In some examples, a group session may be an audio-only group session, where the content item is an audio book. In some examples, any actions, such as pausing and/or fast-forwarding that may be performed at any participating computing device may be performed at all of the participants in the group session. For example, if one participant pauses the content item, it may be paused for all participants. Group sessions can take place on a local network, where two or more of the participants are located in a similar area, or the participants can be remote from each other and the group watch session can take place via a network such as the internet. Although the examples discussed herein predominantly discuss group sessions comprising two computing devices, a group session may comprise any number of computing devices, and all of the examples discussed herein can be implemented on any number of computing devices.

An action is a broad term that may include, for example, generating an interactive content item for output, generating a premium content item for output, and/or generating an advertisement for output. The action may be initiated and/or performed at a first computing device and/or at a second computing device that is associated with the first computing device.

The disclosed methods and systems may be implemented on one or more computing devices. As referred to herein, the computing device can be any device comprising a processor and memory, for example, a television, a smart television, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality headset, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment for enabling an enhanced group watch session, in accordance with some embodiments of the disclosure. The environment 100 comprises a first computing device, such as smart television 102, a network 104 and a second computing device, such as tablet 106. The network 104 may comprise wired and/or wireless means, and may be any suitable network, such as the internet. A group watch session is initiated between the smart television 102 and the tablet 106. The group watch session may be initiated via one or more user interface elements 108, 110 dedicated to initiating a group watch session. On initiating the group watch session, a first portion 112a, 112b of a media content item is received at the smart television 102 and the tablet 106, and the first portion 112a, 112b of the media content item is generated for output. A user may log in to an OTT platform associated with the group watch session via, for example, a user profile 114, 116.

At 118, it is identified that the smart television 102 is configured to receive a second content item, for example an advertisement during an advertisement break. In other examples, the second content item may comprise a content item having digital rights management associated with it and/or a live stream of an event, such as a sporting event. The identification may take place via, for example, first user profile 114. The user profile may indicate that a user is subscribed to an advertisement-supported, or non-premium, package associated with an OTT platform. In other examples, the user profile may indicate if a user is subscribed to a streaming event, such as a pay per view sporting event, and/or premium content associated with a pay per view sporting event, such as exclusive interviews. On identifying that the smart television 102 is configured to receive a second media content item, the second media content item is transmitted to the smart television 102, where it is generated for output.

At 120, it is identified that the tablet 106 is configured to not receive a second content item, for example an advertisement during an advertisement break. In other examples, the second content item may comprise a content item having digital rights management associated with it and/or a live stream of an event, such as a sporting event. The identification may take place via, for example, a second user profile 116. The user profile may indicate that a user is subscribed to an advertisement-free (or relatively reduced advertisement), or premium, package associated with an OTT platform. In this example, by default, the tablet may display a blank screen while the second media content item is being transmitted to, and generated for output at, the smart television 102, so that the group watch session remains synchronized. However, a premium user may feel that this is a sub-par experience, as they are not being shown anything. Steps 118 and 120 may occur concurrently, or substantially concurrently. At 122, a user interface element associated with performing an action is generated for output at the tablet 106. The user interface element may provide a number of options for different actions, such as display premium content (e.g., an interview with an actor in the first content item), display interactive content (e.g., an interactive game) and/or display the advertisement that is being transmitted and displayed at the smart television. If the premium user chooses the advertisement, they may be rewarded by way of a monetary payment, a reduction in subscription fee and/or a digital gift, such as an item for a profile avatar. At 124, input is received in association with one of the actions, and at 126 the action is performed. For example, if the premium user has chosen to watch an advertisement, the advertisement is transmitted to the tablet 106 and is generated for output.

In another example, instead of, or in addition to, identifying whether a computing device (for example, the tablet 106) is configured to receive a second content item via a user profile, the first content item itself, or data associated with the first content item, may be used to perform the identifying. In this example, it may be identified that the first content item does not comprise any advertisements via, for example, a manifest file associated with the first content item. In another example, a playlist may be utilized to identify that the first content item does not comprise any advertisements. The identifying may be performed by an application and/or a playback service. The playback service may be responsible for, for example, fetching a manifest file and/or contacting an advertisement decisioning server if references to advertisements are pre-inserted in the manifest file. The playback service may run on one or more computing devices that are part of a watch party and/or on a server remote to the one or more computing devices of the watch party. In some examples, different versions of the first content item may be transmitted to different computing devices (for example, the smart television 102 and the tablet 106) of a group watch session. For example, the different computing devices may have accessed different versions of the same content item from different sources, with a first source providing an advertisement-supported version of the content item and a second source providing an advertisement-free version of the content item. An application comprising group watch functionality may be utilized to synchronize playback of the content items from different sources. In this example, the application comprising the group watch functionality may automatically pause the advertisement-free version of the content item when advertisements are being transmitted with the advertisement-supported version of the content item. The action may be performed at the computing device(s) at which the first content item is paused. Any of the examples or embodiments discussed herein may utilize one or more of these arrangements instead of, or in addition to, utilizing a user profile to determine whether a user is subscribed to a premium tier or a non-premium tier of a content item service, such as an OTT platform.

Figure 2:
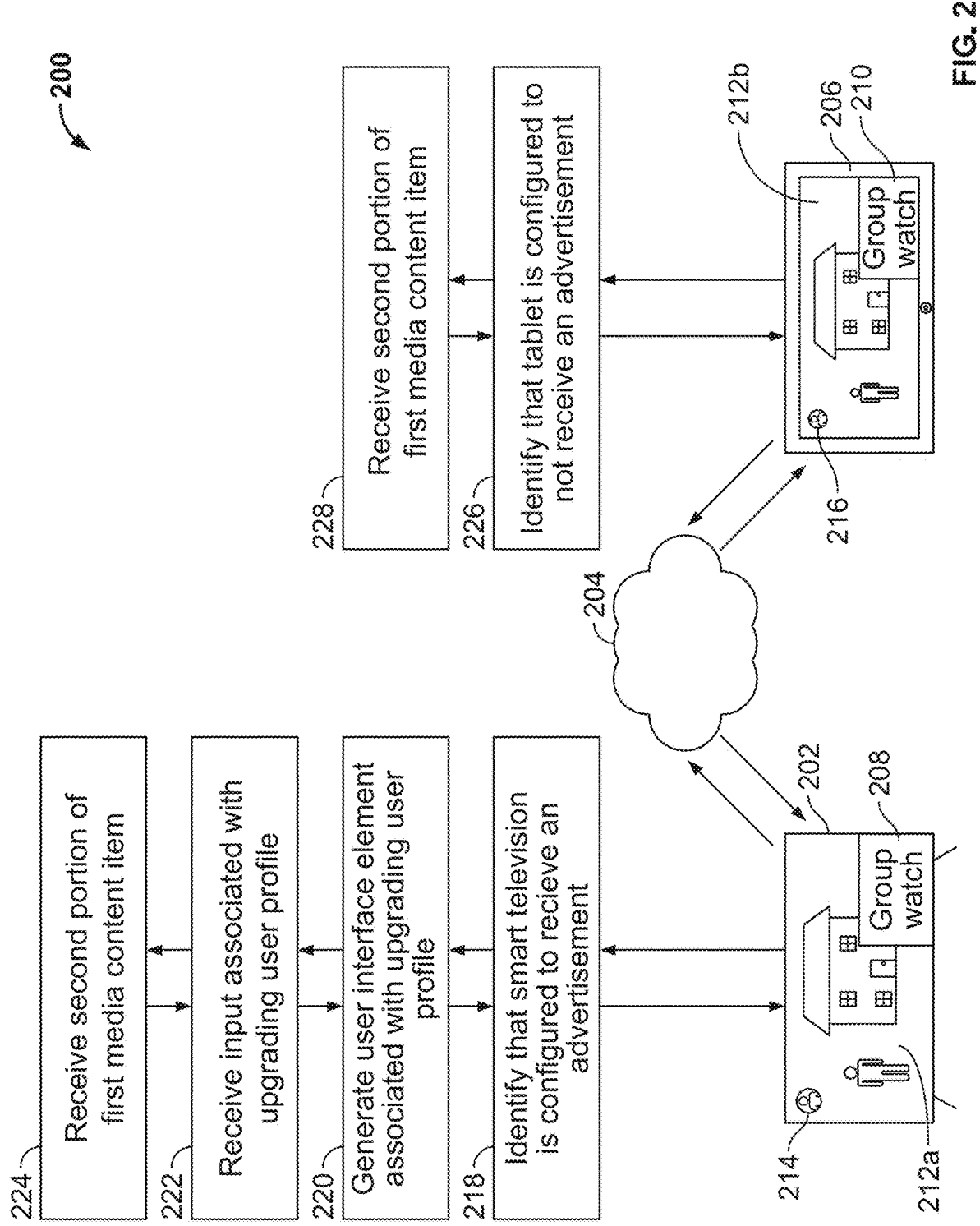
FIG. 2 shows another example environment for enabling an enhanced group watch session, in accordance with some embodiments of the disclosure.

FIG. 2 shows another example environment for enabling an enhanced group watch session, in accordance with some embodiments of the disclosure. In a similar manner to the environment 100 depicted in FIG. 1, the environment 200 comprises a first computing device, such as smart television 202, a network 204 and a second computing device, such as tablet 206. The network 204 may comprise wired and/or wireless means, and may be any suitable network, such as the internet. A group watch session is initiated between the smart television 202 and the tablet 206. The group watch session may be initiated via one or more user interface elements 208, 210 dedicated to initiating a group watch session. On initiating the group watch session, a first portion 212a, 212b of a media content item is received at the smart television 202 and the tablet 206, and the first portion 212a, 212b of the media content item is generated for output. A user may log in to an OTT platform associated with the group watch session via, for example, a user profile 214, 216.

At 218, it is identified that the smart television 202 is configured to receive an advertisement. For example, it may be identified via first user profile 214 that a user is subscribed to an advertisement-supported package on an OTT platform. At 220, a user interface element associated with upgrading the first user profile to a premium package is generated for output at the smart television 202. For example, a dialogue box may ask if a user wishes to upgrade and may present an option such as "Pay now." On receiving input associated with upgrading the user profile, at 222 the user profile is upgraded to a premium package. At 224, a second portion of the first media content item is received at the first smart television 202, in place of an advertisement. At 226, it is identified that the tablet 206 is configured to not receive an advertisement. For example, it may be identified via the second user profile 216 that the user is subscribed to a premium package. At 228, a second portion of the first media content item is received at the tablet 206. Steps 224 and 228 happen in such a manner that the second portion of the first media content item is received at the smart television 202 and the tablet 206 in a synchronized, or substantially synchronized, manner.

Figure 3:
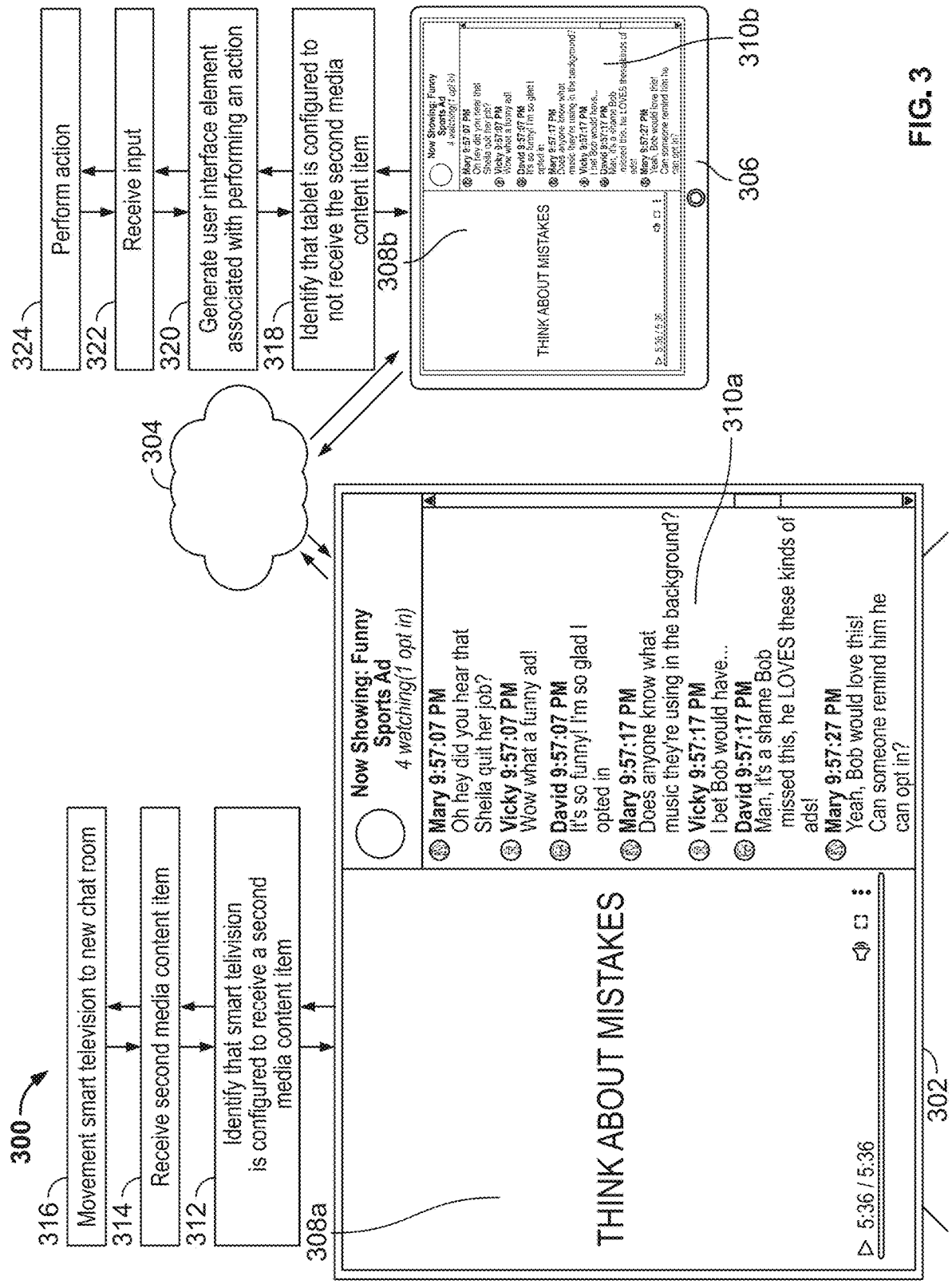
FIG. 3 shows another example environment for enabling an enhanced group watch session, in accordance with some embodiments of the disclosure.

FIG. 3 shows another example environment for enabling an enhanced group watch session, in accordance with some embodiments of the disclosure. In a similar manner to the environments depicted in FIGS. 1 and 2, the environment 300 comprises a first computing device, such as smart television 302, a network 304 and a second computing device, such as tablet 306. The network 304 may comprise wired and/or wireless means, and may be any suitable network, such as the internet. A group watch session is initiated between the smart television 302 and the tablet 306. On initiating the group watch session, a first portion 312a, 312b of a media content item is received at the smart television 302 and the tablet 306, and the first portion 312a, 312b of the media content item is generated for output. In addition to generating the first portion 312a, 312b of the media content item for output, a user interface associated with a chat room 310a, 310b, is generated for output at the smart television 302 and the tablet 306. The chat room may be used by group session members, or participants, to exchange text messages, animations, pictures, sound messages and/or any other form of data for communicating. In addition, user interface options may be generated and output via the chat rooms, for example, interface options associated with receiving an advertisement and/or upgrading to a different OTT package.

At 312, it is identified that the smart television 302 is configured to receive an advertisement. For example, it may be identified via a user profile that a user is subscribed to an advertisement-supported package on an OTT platform. At 314, a second media content item is received at the smart television 302, and at 316, the smart television 302 is moved to a new chat room, for example, a chat room associated with the second media content item. If multiple computing devices in the group watch session are configured to receive the second media content item, then all of the computing devices may be moved to the same chat room.

At 318, it is identified that the tablet 306 is configured to not receive a second content item, for example an advertisement during an advertisement break. The identification may take place via, for example, a second user profile. At 320, a user interface element associated with performing an action is generated for output at the tablet 306. At 322, input is received in association with one of the actions, and at 324 the action is performed. In this example, the tablet 306 remains in the original chat room, because it is not receiving the second media content item.

Figure 4:
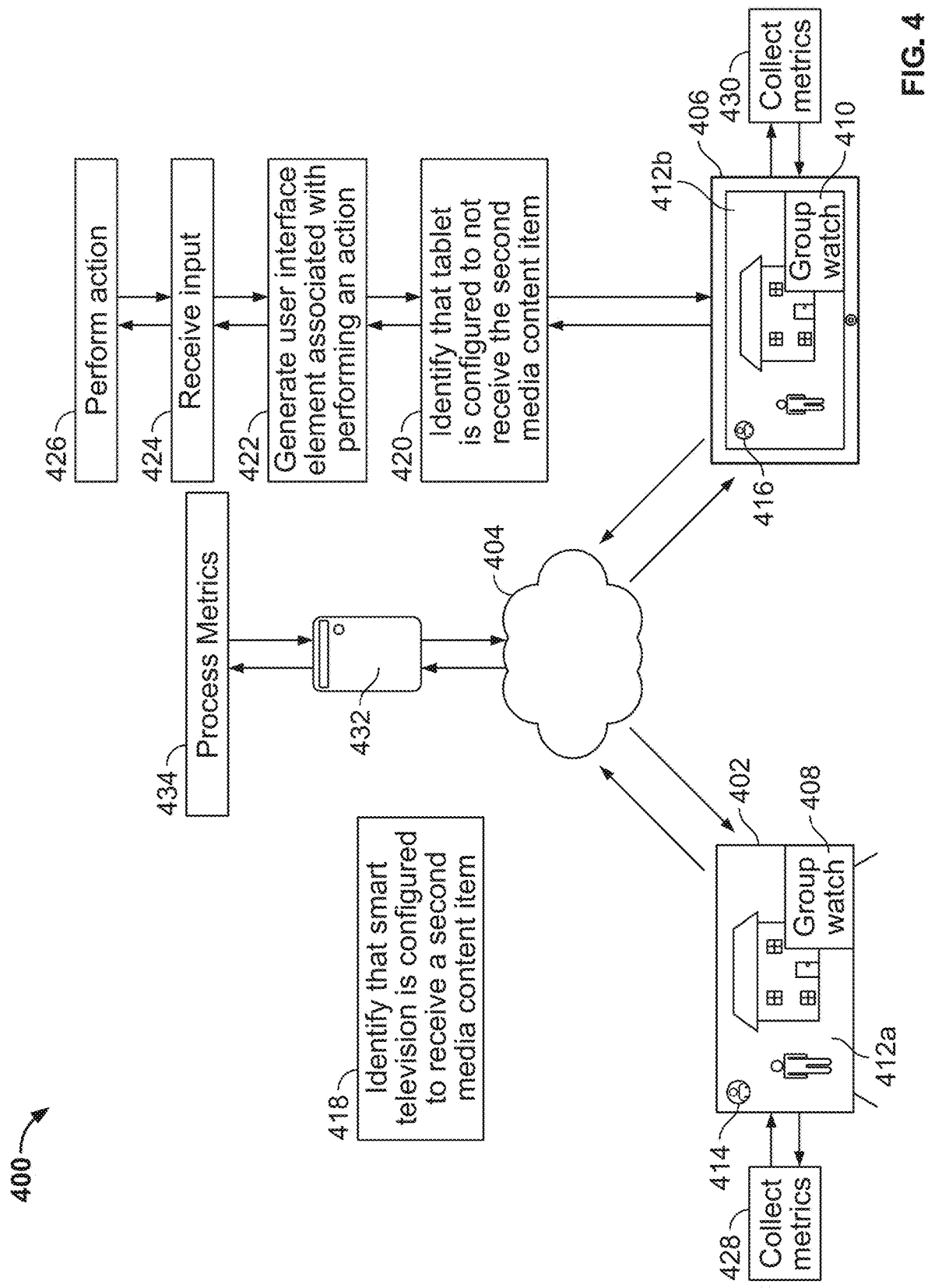
FIG. 4 shows another example environment for enabling an enhanced group watch session, in accordance with some embodiments of the disclosure.

FIG. 4 shows another example environment for enabling an enhanced group watch session, in accordance with some embodiments of the disclosure. In a similar manner to the environments 100, 200, 300 depicted in FIGS. 1-3, the environment 400 comprises a first computing device, such as smart television 402, a network 404, a second computing device, such as tablet 406 and a server 432. The network 404 may comprise wired and/or wireless means, and may be any suitable network, such as the internet. A group watch session is initiated between the smart television 402 and the tablet 406. The group watch session may be initiated via one or more user interface elements 408, 410 dedicated to initiating a group watch session. On initiating the group watch session, a first portion 412a, 412b of a media content item is received at the smart television 402 and the tablet 406, and the first portion 412a, 412b of the media content item is generated for output. A user may log in to an OTT platform associated with the group watch session via, for example, a user profile 414, 416.

At 418, it is identified that the smart television 402 is configured to receive a second media content item, such as an advertisement. For example, it may be identified via the first user profile 414 that a user is subscribed to an advertisement-supported package on an OTT platform. At 420, it is identified that the tablet 406 is configured to not receive a second content item, for example an advertisement during an advertisement break. The identification may take place via, for example, the second user profile 416. At 422, a user interface element associated with performing an action is generated for output at the tablet 406. At 424, input is received in association with one of the actions, and at 422 the action is performed. At every stage of the aforementioned processes, metrics may be collected 428, 430 at the smart television 402 and the tablet 406. Such metrics may comprise interaction data, device data and/or any other data that may be collected via the smart television 402 and the tablet 406. The metrics are transmitted via network 404 to the server 432, where the metrics are processed 434. The server 432 may be a server associated with an OTT platform, or a server associated with an advertisement provider. In some examples, the server 432 may be the same server that delivers content to the smart television 402 and the tablet 406. In other examples, the server may be a virtual and/or physical server different from the server that delivers content to the smart television 402 and the tablet 406.

Figure 5:
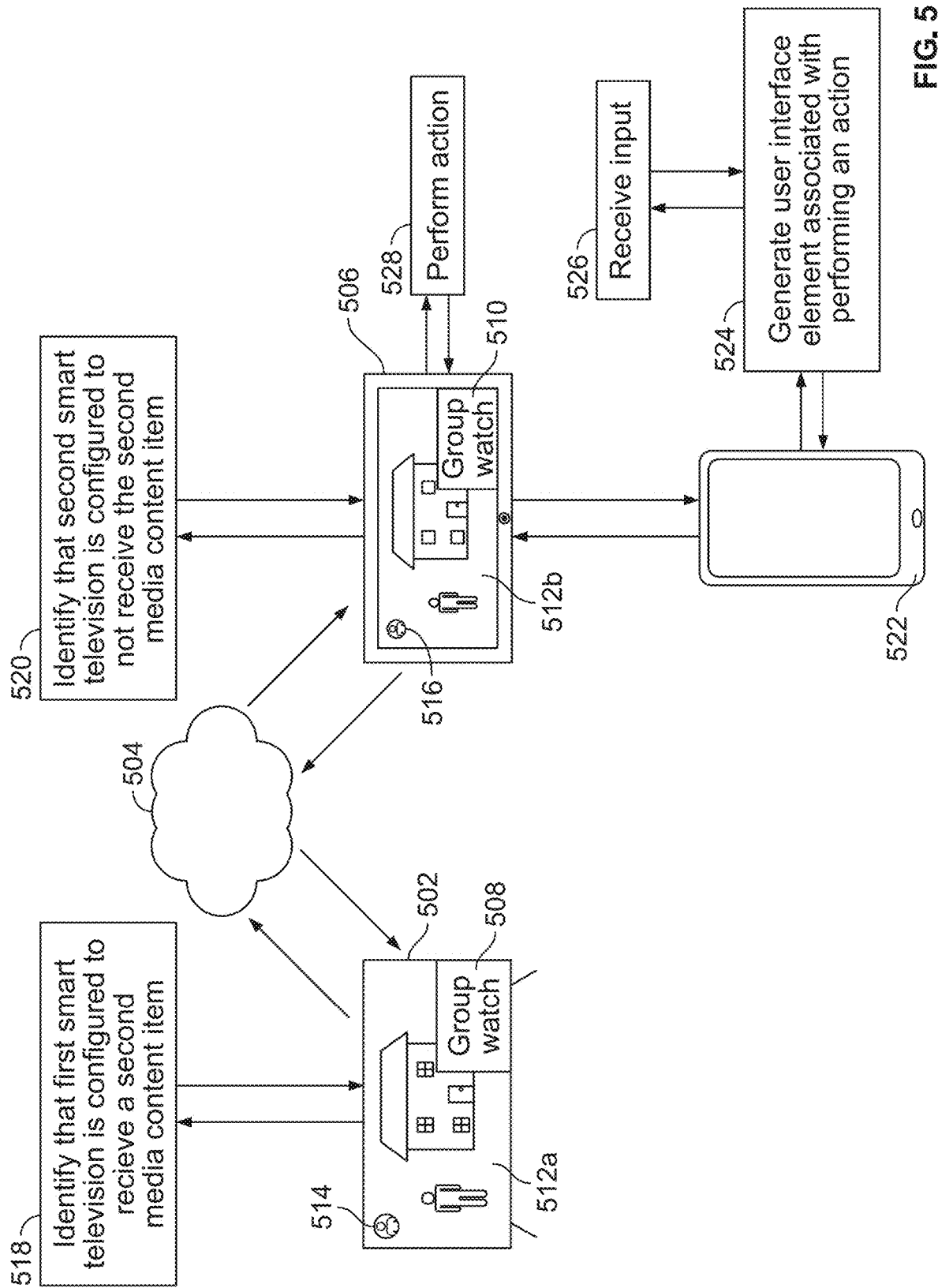
FIG. 5 shows another example environment for enabling an enhanced group watch session, in accordance with some embodiments of the disclosure.

FIG. 5 shows another example environment for enabling an enhanced group watch session, in accordance with some embodiments of the disclosure. In a similar manner to the environments 100, 200, 300, 400 depicted in FIGS. 1-4, the environment 500 comprises a first computing device, such as first smart television 502, a network 504, a second computing device, such as second smart television 506, and a third computing device, such as smartphone 522. The network 504 may comprise wired and/or wireless means, and may be any suitable network, such as the internet. A group watch session is initiated between the first smart television 502 and the second smart television 506. The group watch session may be initiated via one or more user interface elements 508, 510 dedicated to initiating a group watch session. On initiating the group watch session, a first portion 512a, 512b of a media content item is received at the first smart television 502 and the second smart television 506, and the first portion 512a, 512b of the media content item is generated for output. A user may log in to an OTT platform associated with the group watch session via, for example, a user profile 514, 516.

At 518, it is identified that the first smart television 502 is configured to receive a second media content item, and at 520 it is identified that the second smart television 506 is configured to not receive a second media content item. In response to identifying that the second smart television 506 is configured to not receive a second media content item, a message is transmitted to the smart phone 522. The smart phone is associated with the second smart television 506. For example, both of the devices may be logged onto the same OTT platform and/or connected to the same local network, such as the same Wi-Fi network. At 524, a user interface element associated with performing an action is generated for output at the smartphone 522, and an input 526 associated with performing an action is received at the smartphone 522. A message indicating the action to be performed is transmitted to the second smart television 506, and the action is performed at the smart television 506. Such an arrangement may be advantageous as it may allow relatively complex information, or input, to be generated for output, or received, at the smartphone 522, rather than the smart television 506.

Figure 6:
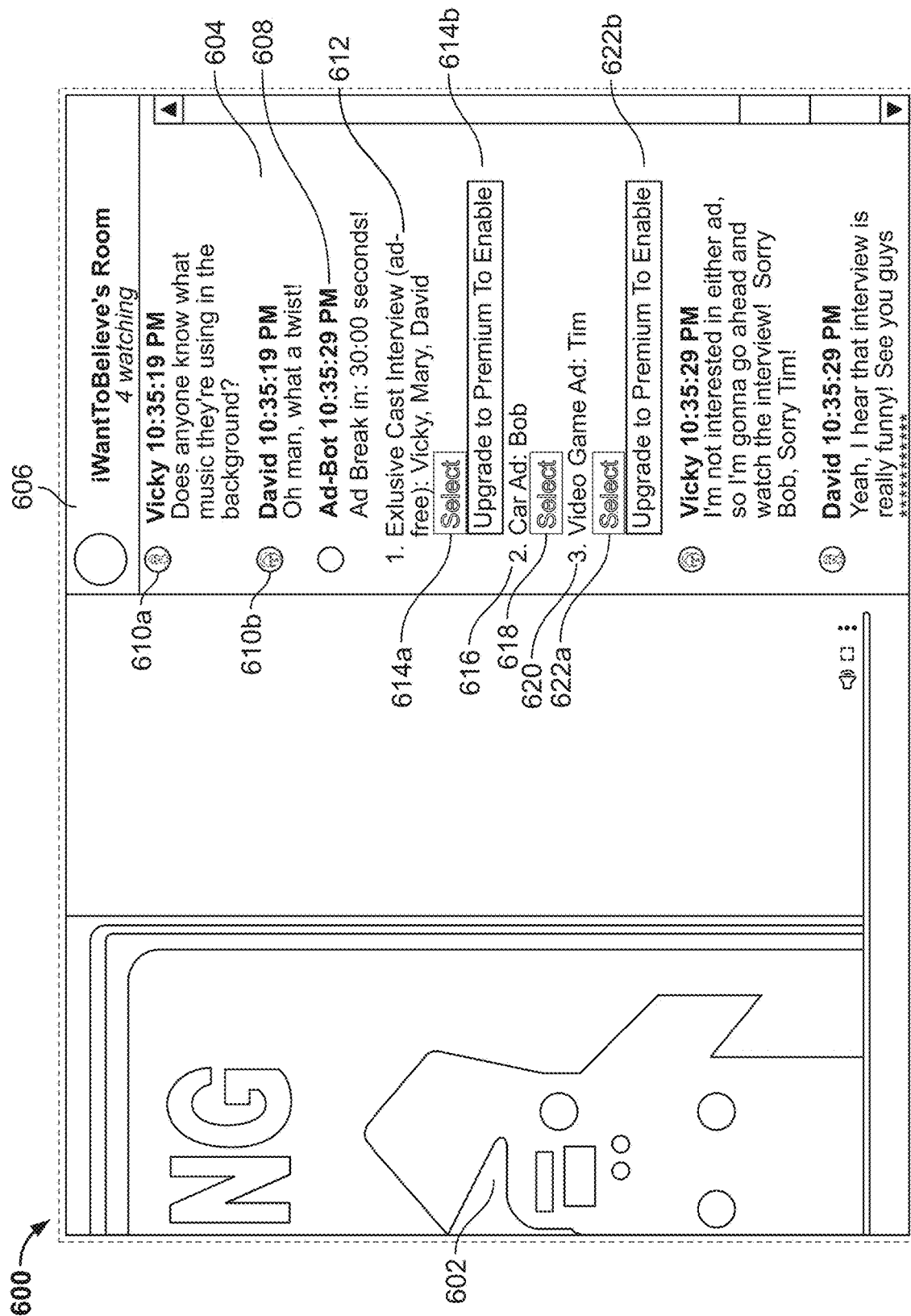
FIG. 6 shows an example chat room for an enabling an enhanced group watch session, in accordance with some embodiments of the disclosure.

FIG. 6 shows an example chat room for enabling an enhanced group watch session, in accordance with some embodiments of the disclosure. The environment 600 comprises a display outputting a content item 602, and a chat room 604. The chat room may have a label 606 associated with it, in this example "iWantToBelieve's Room." The chat room may have one or more bots 608, for performing automated actions, and a plurality of users, for example a first user 610a and a second user 610b. In this example, the bot is configured to present a number of options to a user. The bot enables a user to choose an option of watching an exclusive interview 612, watch a first advertisement 616, or watch a second advertisement 620. As the present user is a non-premium user, some options are greyed out, such as the watch option 614a associated with the exclusive interview 612. The user is given an option to upgrade 614b, 622b, in order to unlock other options 614a, 622a.

Figure 7:
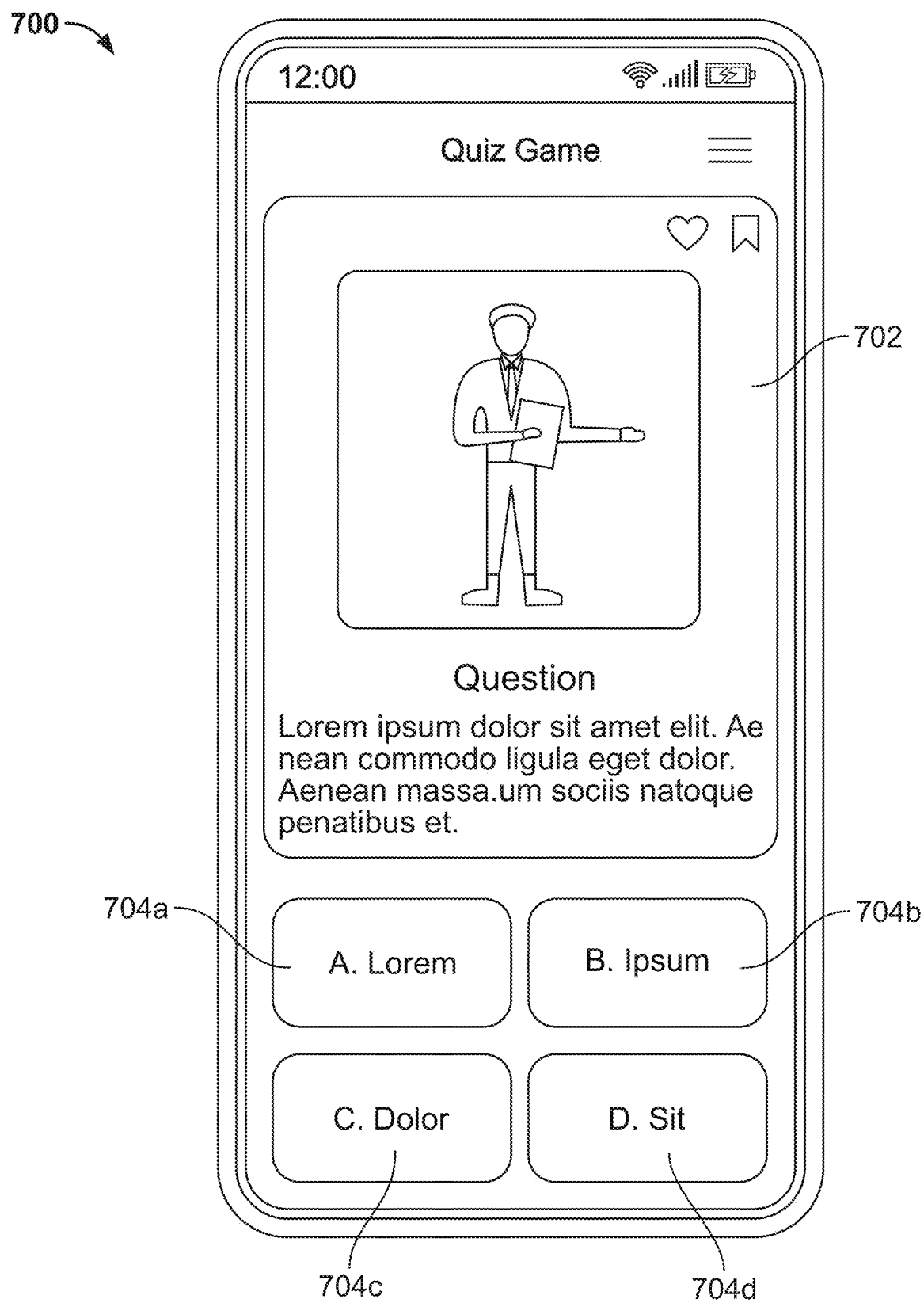
FIG. 7 shows an example interactive content item for output to premium users, in accordance with some embodiments of the disclosure.

FIG. 7 shows an example interactive content item for output to premium users, in accordance with some embodiments of the disclosure. The interactive content item 700 comprises a quiz question 702 and a plurality of answers 704a, 704b, 704c, 704d. Input may be received with one of the answers, and a subsequent question may be generated for output. In some examples, a timer may be associated with the interactive content item, and the interactive content item may be automatically closed after a displayed time period in order to ensure synchronicity with the other members of the group watch session. In some examples, the interactive content item may be generated for output via a secondary computing device, for example, in the manner shown in FIG. 5 above.

Figure 8:
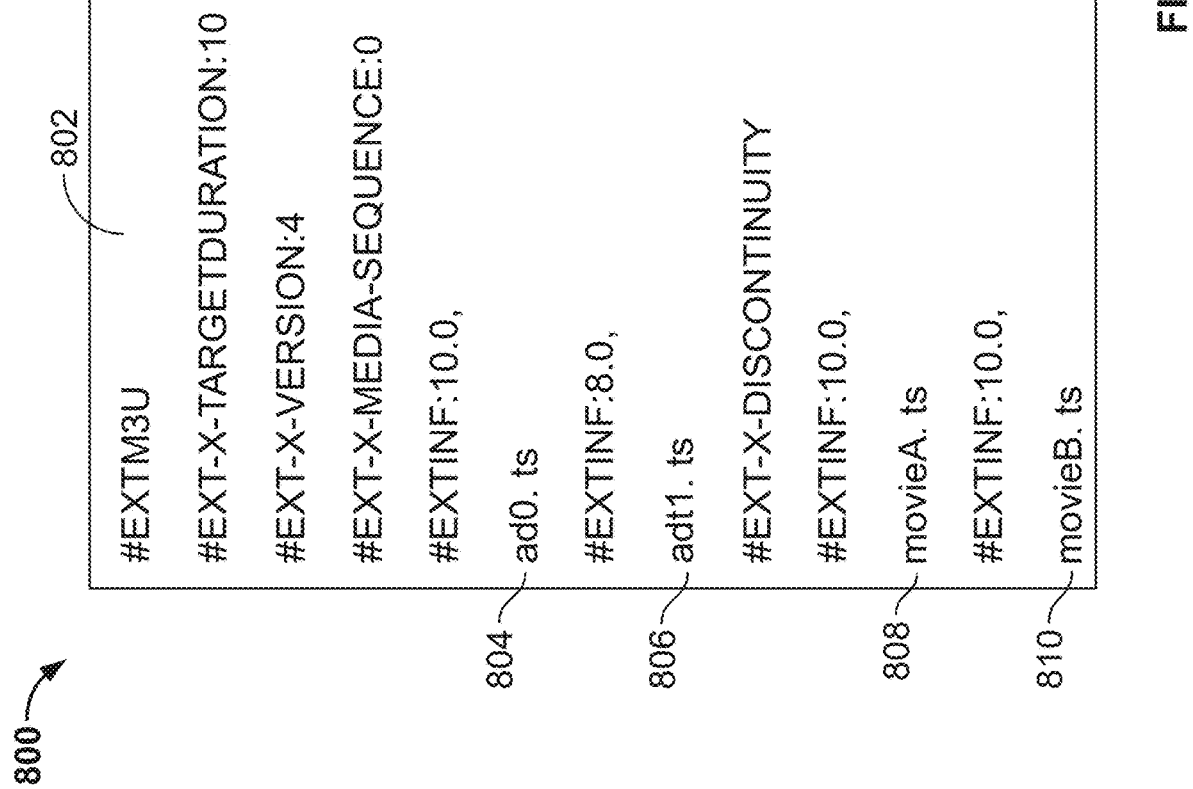
FIG. 8 shows an example manifest file for use in enabling an enhanced group watch session, in accordance with some embodiments of the disclosure.

FIG. 8 shows an example manifest file 800 for use in enabling an enhanced group watch session, in accordance with some embodiments of the disclosure. The manifest file 800 is formatted in a standard format 802 and may make available a plurality of advertisements 804, 806, in addition to content item segments 808, 810. If a user upgrades to a premium package associated with an OTT platform, or a premium user requests to view an advertisement, an updated manifest file may be transmitted to the computing device associated with the user. In some examples, an application and/or playback service running on a computing device (e.g., computing devices 102, 106, 202, 206, 302, 306, 402, 406, 502, 506) may check a manifest file for the presence of a marker and/or tag indicating that one or more advertisements are to be transmitted to the computing device. In one example, such a tag may be the EXT-X-DISCONTINUITY tag shown in FIG. 8. Such a tag may be part of a standard such as, for example, the HTTP live streaming (HLS) standard.

Figure 9:
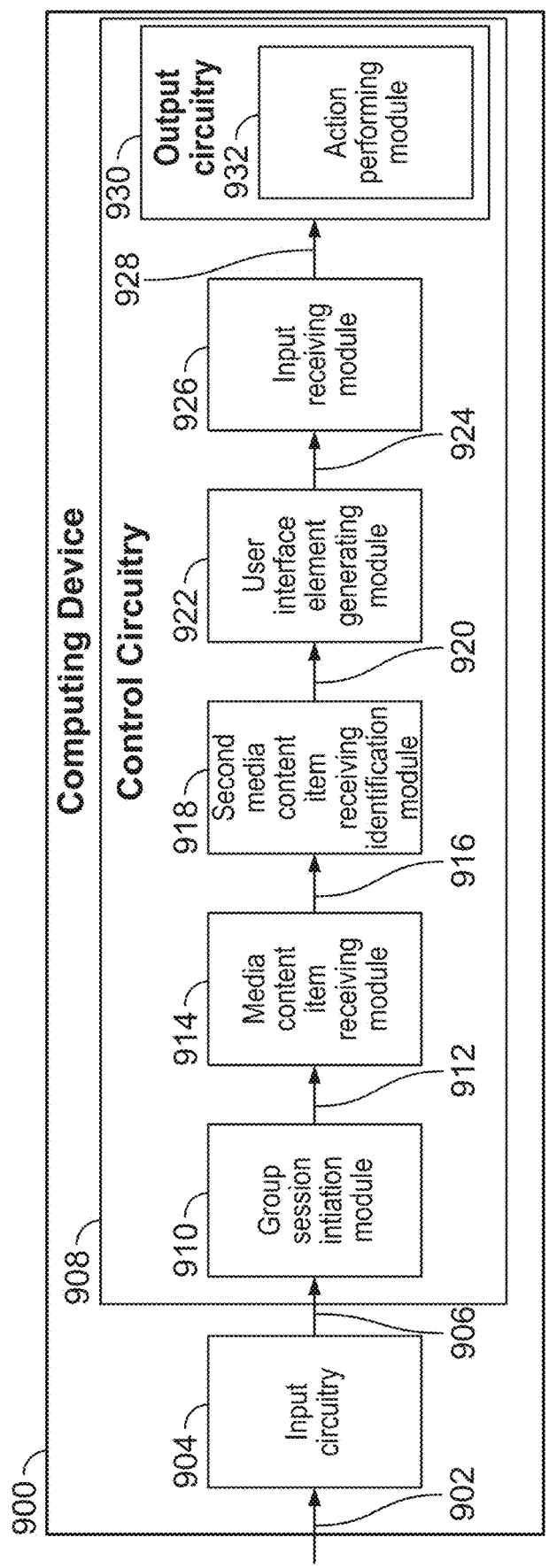
FIG. 9 shows a block diagram representing components of a computing device and dataflow therebetween for enabling an enhanced group watch session, in accordance with some embodiments of the disclosure.

FIG. 9 shows a block diagram representing components of an example computing device 900 and dataflow therebetween for enabling an enhanced group watch session, in accordance with some embodiments of the disclosure. Computing device 900 (e.g., computing devices 102, 106, 202, 206, 302, 306, 402, 406, 502, 506) comprises input circuitry 904, control circuitry 908 and output circuitry 930. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 902 by the input circuitry 904. The input circuitry 904 is configured to received inputs related to a computing device. For example, this may be via gesture detected via an extended reality device. In other examples, this may be via an infrared controller, Bluetooth and/or Wi-Fi controller of the computing device 900, a touchscreen, a keyboard, a mouse and/or a microphone. In another example, the input may comprise instructions received via another computing device. The input circuitry 904 transmits 906 the user input to the control circuitry 908.

The control circuitry 908 comprises a group session initiation module 910, a media content item receiving module 914, a second media content item receiving identification module 918, a user interface element generating module 922, an input receiving module 926, and output circuitry 930. The output circuitry 930 comprises an action performing module 932. The input is transmitted 906 to the group session initiation module 910, where a group session for consuming a media content item is initiated between two or more computing devices. On initiation of the group session, an indication is transmitted 912 to the media content item receiving module 914, where a media content item is received. On receiving a first portion of the media content item at the computing device, an indication is transmitted 916 to the second media content item receiving identification module 918, where it is identified, for example, via a user profile associated with an OTT platform logged in at the computing device, whether a second media content item is to be received at the computing device. On identifying that a second media content item will not be received at the computing device, an indication is transmitted 920 to the user interface element generating module 922, where a user interface element associated with performing an action is generated for output. On generating the user interface for output, an indication is transmitted 924 to the input receiving module 926. On receiving an input, an indication is transmitted 928 to the output circuitry 930, where the action performing module 932 performs an action.

Figure 10:
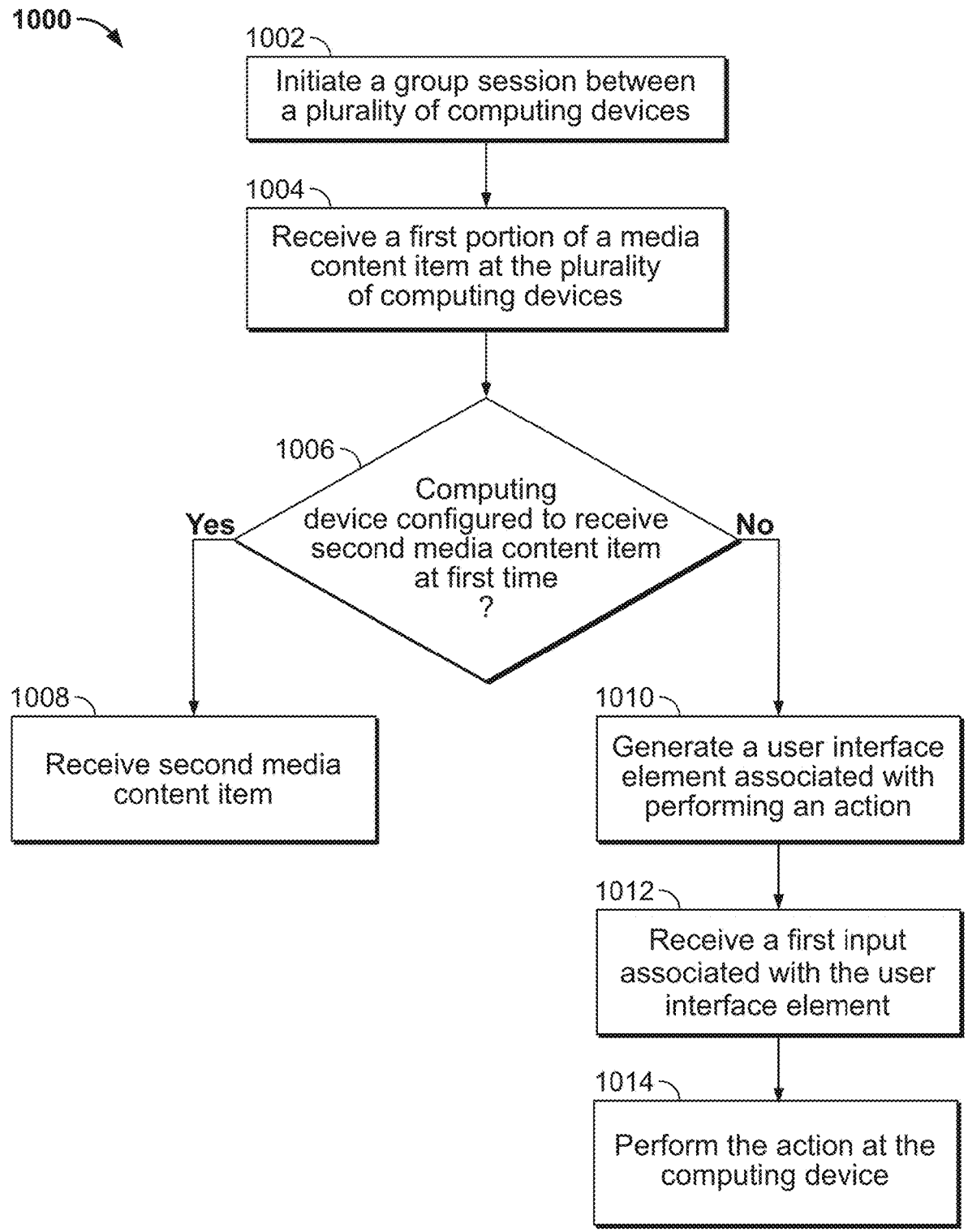
FIG. 10 shows a flowchart of illustrative steps involved in enabling an enhanced group watch session, in accordance with some embodiments of the disclosure.

FIG. 10 shows a flowchart of an example process 1000 including illustrative steps involved in enabling an enhanced group watch session, in accordance with some embodiments of the disclosure. Process 1000 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1000 may be incorporated into or combined with one or more actions of any other process or embodiments described herein.

At 1002, a group session for consuming a media content item is initiated between a plurality of computing devices. At 1004, a first portion of a media content item is received at the plurality of computing devices. At 1006, it is determined whether each computing device of the plurality of computing devices is configured to receive a second media content item at a common first time. If the computing device is configured to receive a second media content item at the first time, then, at 1008, the second media content item is received, at the first time, at that computing device. If the computing device is configured to not receive a second media content item at the first time, then, at 1010, a user interface element associated with performing an action is generated. At 1012, a first input associated with the user interface element is received. At 1014, the action is performed at the computing device.

Figure 11:
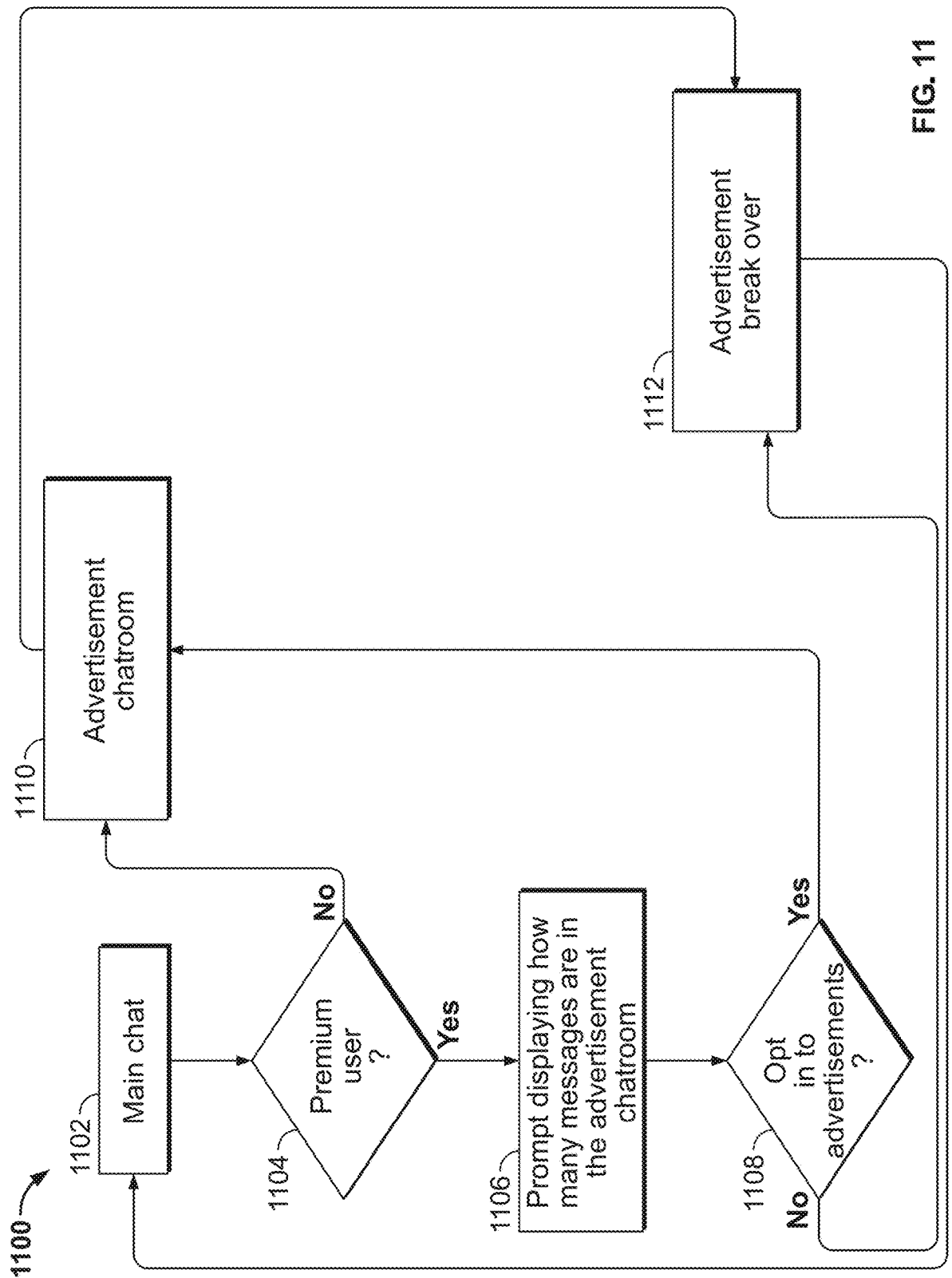
FIG. 11 shows another flowchart of illustrative steps involved in enabling an enhanced group watch session, in accordance with some embodiments of the disclosure.

FIG. 11 shows another flowchart of an example process 1100 including illustrative steps involved in enabling an enhanced group watch session, in accordance with some embodiments of the disclosure. Process 1100 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1100 may be incorporated into or combined with one or more actions of any other process or embodiments described herein.

Process 1100 depicts the prompting of advertisement-free users of a platform, such as an OTT platform, to voluntarily opt in to watch an advertisement so as to continue on with the rest of their group, of a group watch session, to an advertisement sub chat room. At 1102, a main chat room is initiated with all the members of the group watch session. At 1104, it is determined if a member is a premium user (i.e., whether the member will receive advertisements by default, where a premium user will not receive advertisements by default, and a non-premium user will receive advertisements by default). If the member is a premium user, then, at 1106, a prompt, or user interface element, is generated for output at a computing device of the premium member(s) of the group watch session. The prompt indicates how many messages are in the advertisement chat room. At 1108, it is determined whether the premium user has opted in to advertisements, for example by providing input associated with a user interface element at a computing device associated with the premium user, or users. If the user is not a premium user, or is a premium user that has opted in to advertisements, then, at 1110, those members of the group watch session enter an advertisement chat room. At 1112, once the advertisement break has finished, all members of the group watch session are returned to the main chat room 1102.

Figure 12:
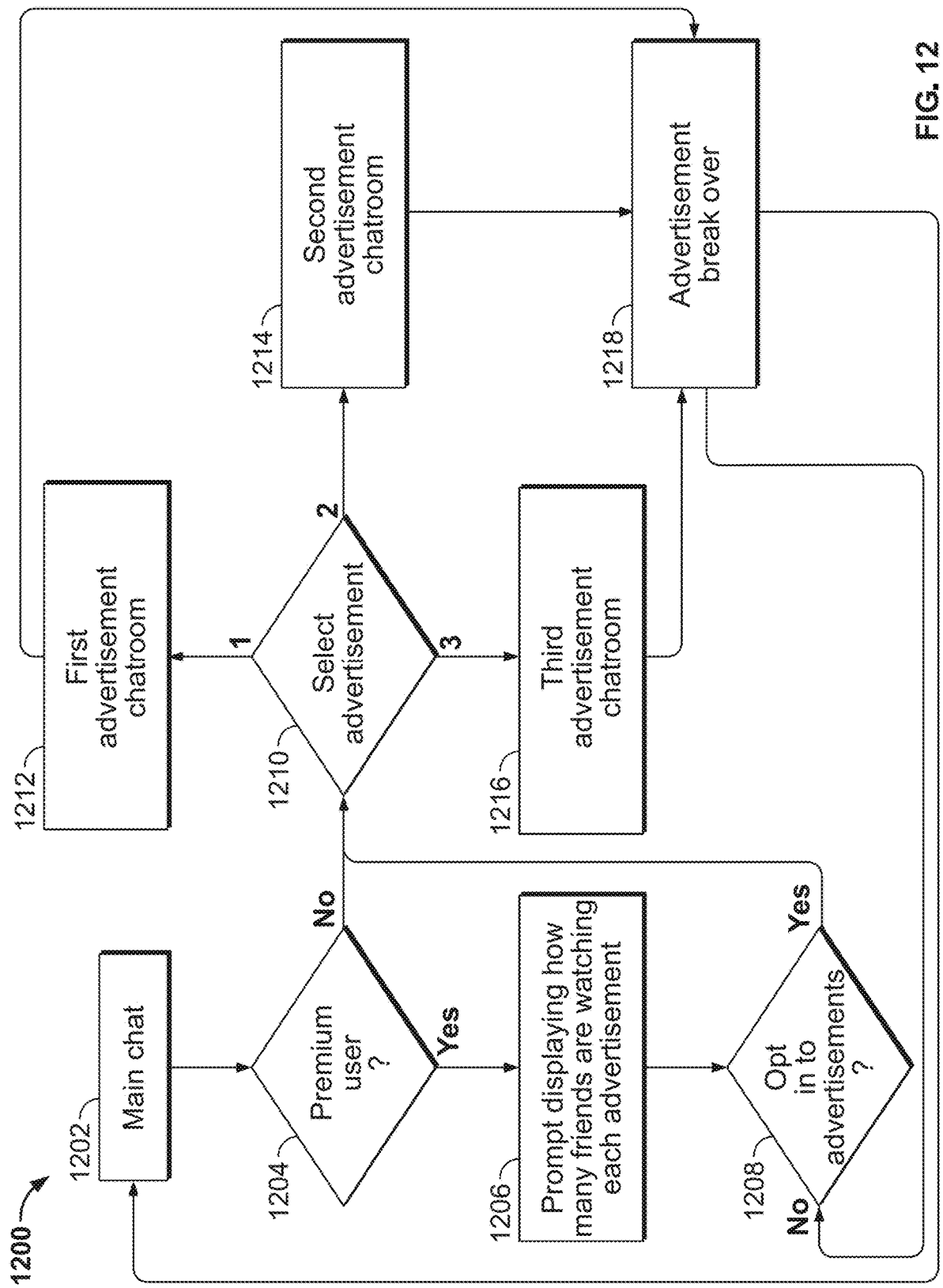
FIG. 12 shows another flowchart of illustrative steps involved in enabling an enhanced group watch session, in accordance with some embodiments of the disclosure.

FIG. 12 shows another flowchart of an example process 1200 including illustrative steps involved in enabling an enhanced group watch session, in accordance with some embodiments of the disclosure. Process 1200 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1200 may be incorporated into or combined with one or more actions of any other process or embodiments described herein.

Process 1200 depicts the prompting of advertisement-free users of a platform, such as an OTT platform, to voluntarily opt in to watch an advertisement, from a plurality of advertisements, so as to continue on with the rest of their group, of a group watch session, to an advertisement sub chat room. At 1202, a main chat room is initiated with all the members of the group watch session. At 1204, it is determined if a member is a premium user (i.e., whether the member will receive advertisements by default, where a premium user will not receive advertisements by default, and a non-premium user will receive advertisements by default). If the member is a premium user, then, at 1206, a prompt, or user interface element, is generated for output at a computing device of the premium member(s) of the group watch session. The prompt indicates how members of the group watch session are watching each advertisement. At 1208, it is determined whether the premium user has opted in to advertisements, for example by providing input associated with a user interface element at a computing device associated with the premium user, or users. If the user is not a premium user, or is a premium user that has opted in to advertisements, then, at 1210, those members of the group watch session select an advertisement and, at 1210, it is determined which advertisement a member has selected. The members of the group watch session enter first, second or third advertisement chat rooms 1212, 1214, 1216 based on their selection. At 1218, once the advertisement break has finished, all members of the group watch session are returned to the main chat room 1202.

Figure 13:
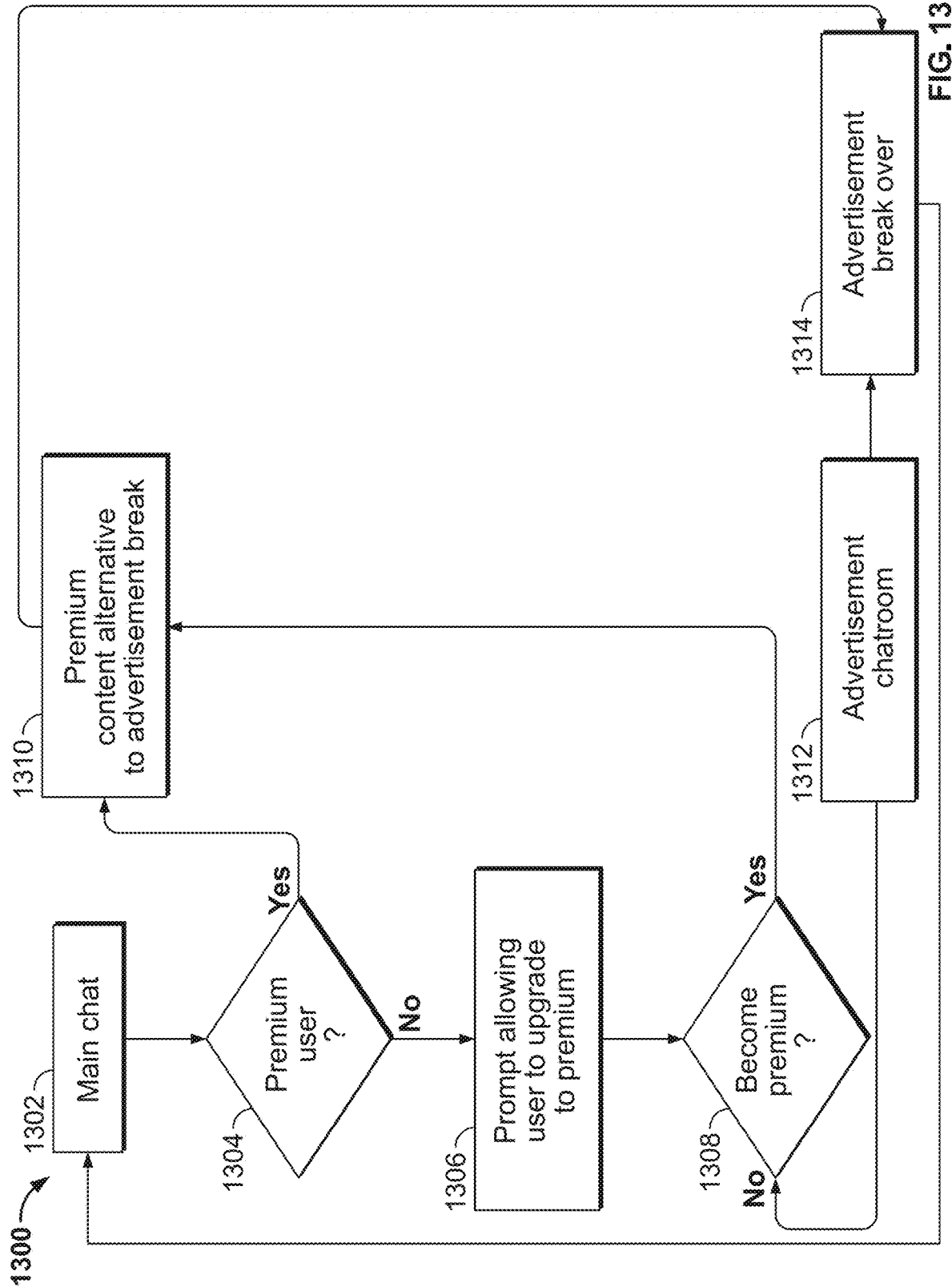
FIG. 13 shows another flowchart of illustrative steps involved in enabling an enhanced group watch session, in accordance with some embodiments of the disclosure.

FIG. 13 shows another flowchart of an example process 1300 including illustrative steps involved in enabling an enhanced group watch session, in accordance with some embodiments of the disclosure. Process 1300 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1300 may be incorporated into or combined with one or more actions of any other process or embodiments described herein.

Process 1300 depicts placing premium users in a different chatroom than non-premium users during an advertisement break in a watch session. At 1302, a main chat room is initiated with all the members of the group watch session. At 1304, it is determined if a member is a premium user (i.e., whether the member will receive advertisements by default, where a premium user will not receive advertisements by default, and a non-premium user will receive advertisements by default). If the member is not a premium user, then, at 1306, a prompt, or user interface element, is generated for output at a computing device of the non-premium member(s) of the group watch session. The prompt enables a non-premium user to upgrade to become a premium user, for example by subscribing to a premium package of an OTT platform. At 1308, it is determined whether the non-premium user has become a premium user. If the non-premium user has become a premium user, or if the member of the group watch session was already a premium user, as determined at 1304, then at 1310, premium content is delivered to the computing device(s) of those members of the group watch session, in place of an advertisement. If, at 1308, it is determined that a member of the group watch session is still a non-premium user, then at 1312, the member is placed in an advertisement chat room. At 1314, once the advertisement break has finished, all members of the group watch session are returned to the main chat room 1302.

Figure 14:
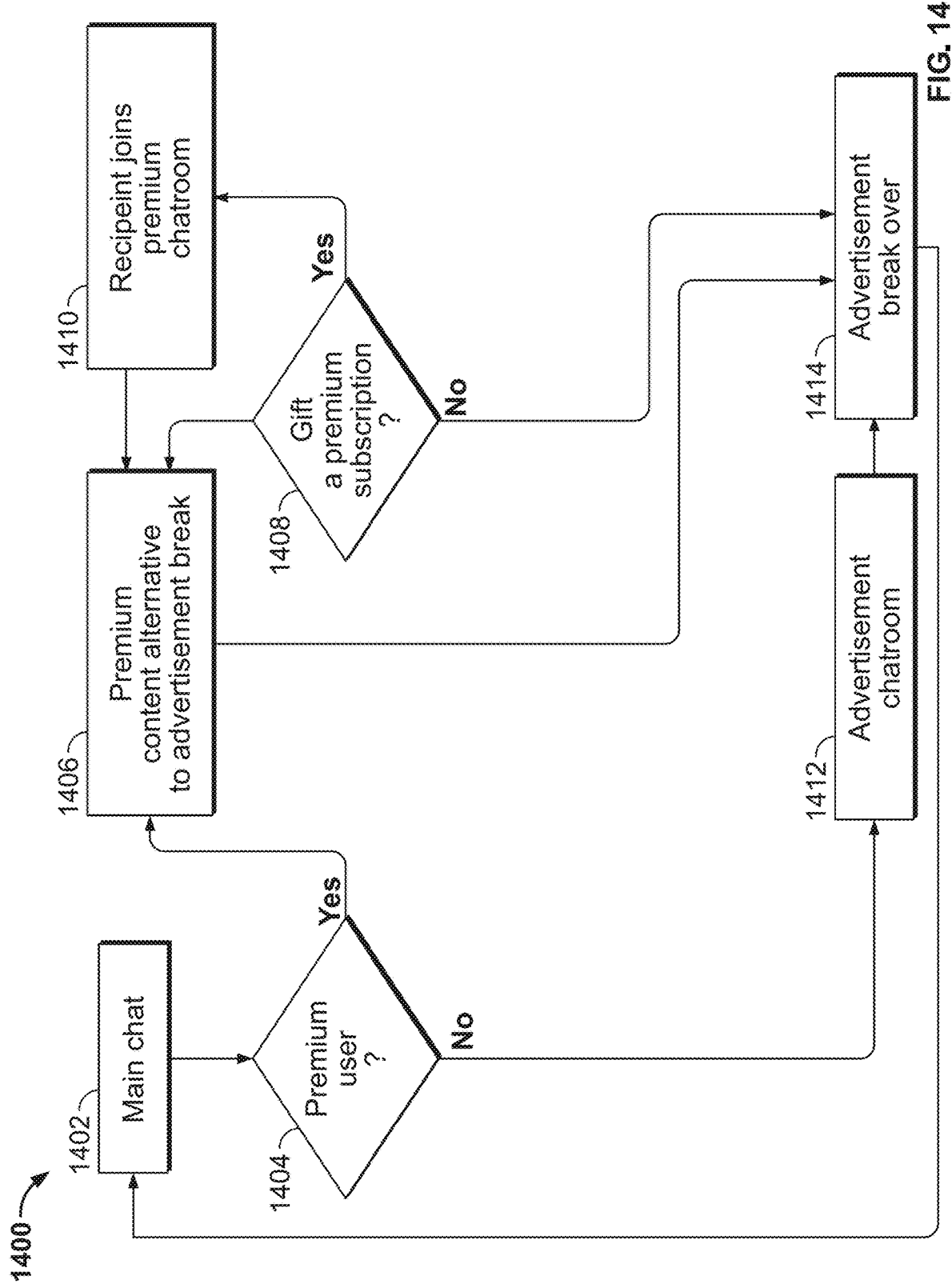
FIG. 14 shows another flowchart of illustrative steps involved in enabling an enhanced group watch session, in accordance with some embodiments of the disclosure.

FIG. 14 shows another flowchart of an example process 1400 including illustrative steps involved in enabling an enhanced group watch session, in accordance with some embodiments of the disclosure. Process 1400 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1400 may be incorporated into or combined with one or more actions of any other process or embodiments described herein.

Process 1400 depicts a premium user gifting a subscription to another member of a group watch session, allowing them to view, for example, premium content and chats during an advertisement break in a watch session. At 1402, a main chat room is initiated with all the members of the group watch session. At 1404, it is determined if a member is a premium user (i.e., whether the member will receive advertisements by default, where a premium user will not receive advertisements by default, and a non-premium user will receive advertisements by default). If it is determined that a user is a premium user, then, at 1406, premium content is delivered, in place of an advertisement, to a computing device associated with the premium user. At 1408, it is determined whether the premium user has gifted a premium subscription to, for example, an OTT platform, to a non-premium user. If it is determined that the user has gifted a premium subscription to a non-premium user then, at 1410, the non-premium user joins the premium chat room, and, at 1406, a computing device associated with the non-premium user receives premium content in place of an advertisement. If, at 1404, it is determined that a user is not a premium user, then, at 1412, the user is put in an advertisement chat room. At 1414, once the advertisement break has finished, all members of the group watch session are returned to the main chat room 1402.

Figure 15:
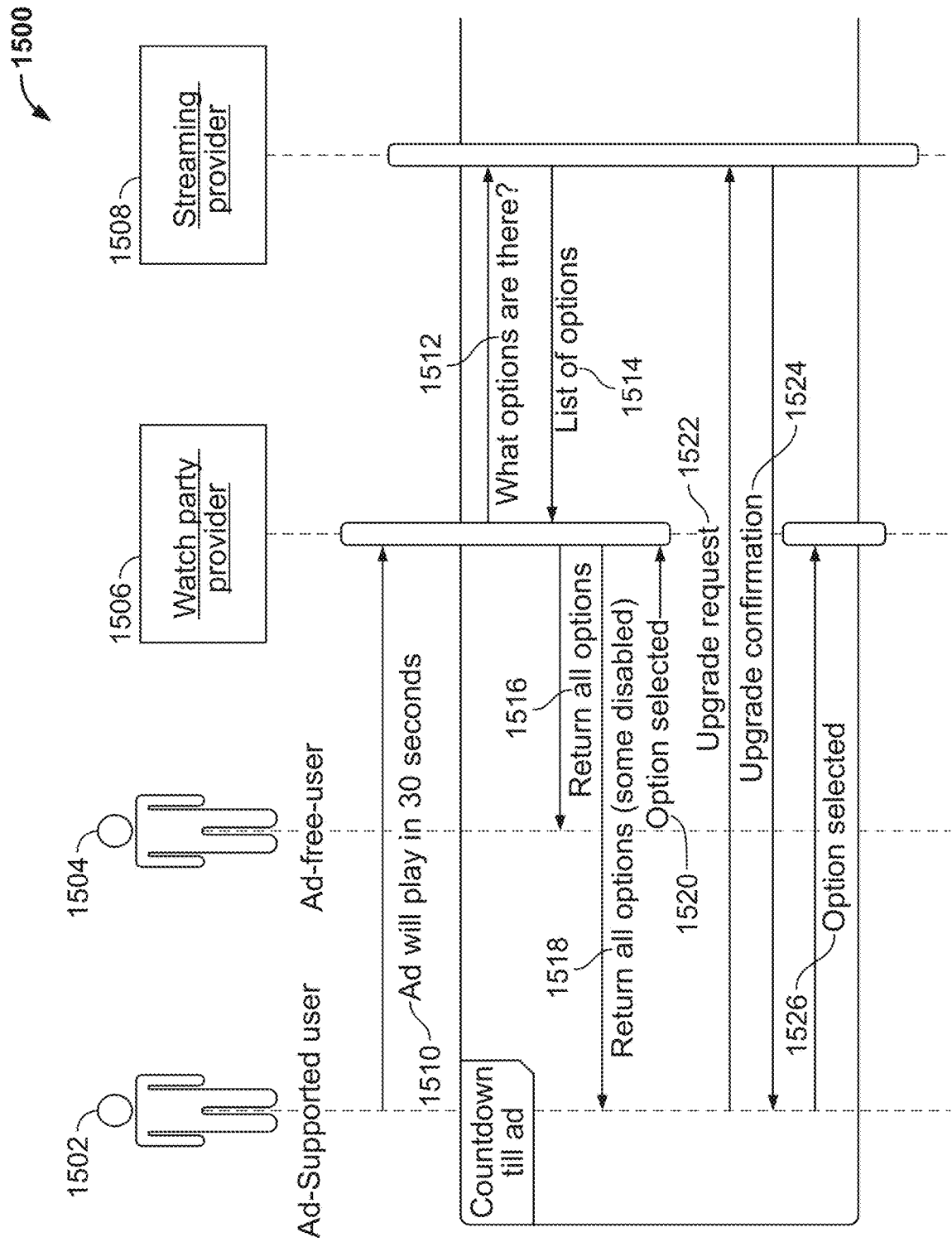
FIG. 15 shows an example process of illustrative steps involved in enabling an enhanced group watch session, in accordance with some embodiments of the disclosure.

FIG. 15 shows an example process including illustrative steps involved in enabling an enhanced group watch session, in accordance with some embodiments of the disclosure. Process 1500 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1500 may be incorporated into or combined with one or more actions of any other process or embodiments described herein.

The environment 1500 comprises an advertisement-supported user 1502, an advertisement-free, or premium, user 1504, a watch party provider 1506 and a streaming provider 1508. In this example, a notification 1510 may be generated for output at a computing device associated with the users 1502, 1504, that indicates that an advertisement will play in 30 seconds. The watch party provider 1506 communicates with the streaming provider 1508 to determine which options are available 1512, i.e., for example, whether an upgrade for the advertisement-supported user 1502 is available, or whether premium content is available for the advertisement-free user 1504 to consume during the advertisement break. At 1514, the streaming provider 1508 returns a list of options 1514 to the watch party provider 1506. The watch party provider 1506 transmits the list of options 1516 to an application associated with the watch party provider at a computing device associated with the advertisement-free user 1504. The watch party provider 1506 also transmits the list of options, with some options disabled 1518, to an application associated with the watch party provider at a computing device associated with the advertisement-supported user 1502. The advertisement-free user 1504 selects an option 1520 at the application, and the option is transmitted to the watch party provider 1506. For example, the option may be to consume premium content during the advertisement break. The advertisement-supported user 1502 chooses to upgrade to an advertisement-free package. The upgrade request 1522 is received via an iframe, or another nested instance of a streaming provider application at the computing device associated with the advertisement-supported user 1502, and is transmitted directly to the streaming provider 1508. Confirmation 1524 of the upgrade is transmitted directly to the computing device that transmitted the request, and all options are enabled for the user 1502. On selecting 1526 an option, the option is transmitted to the watch party provider 1506.

Figure 16:
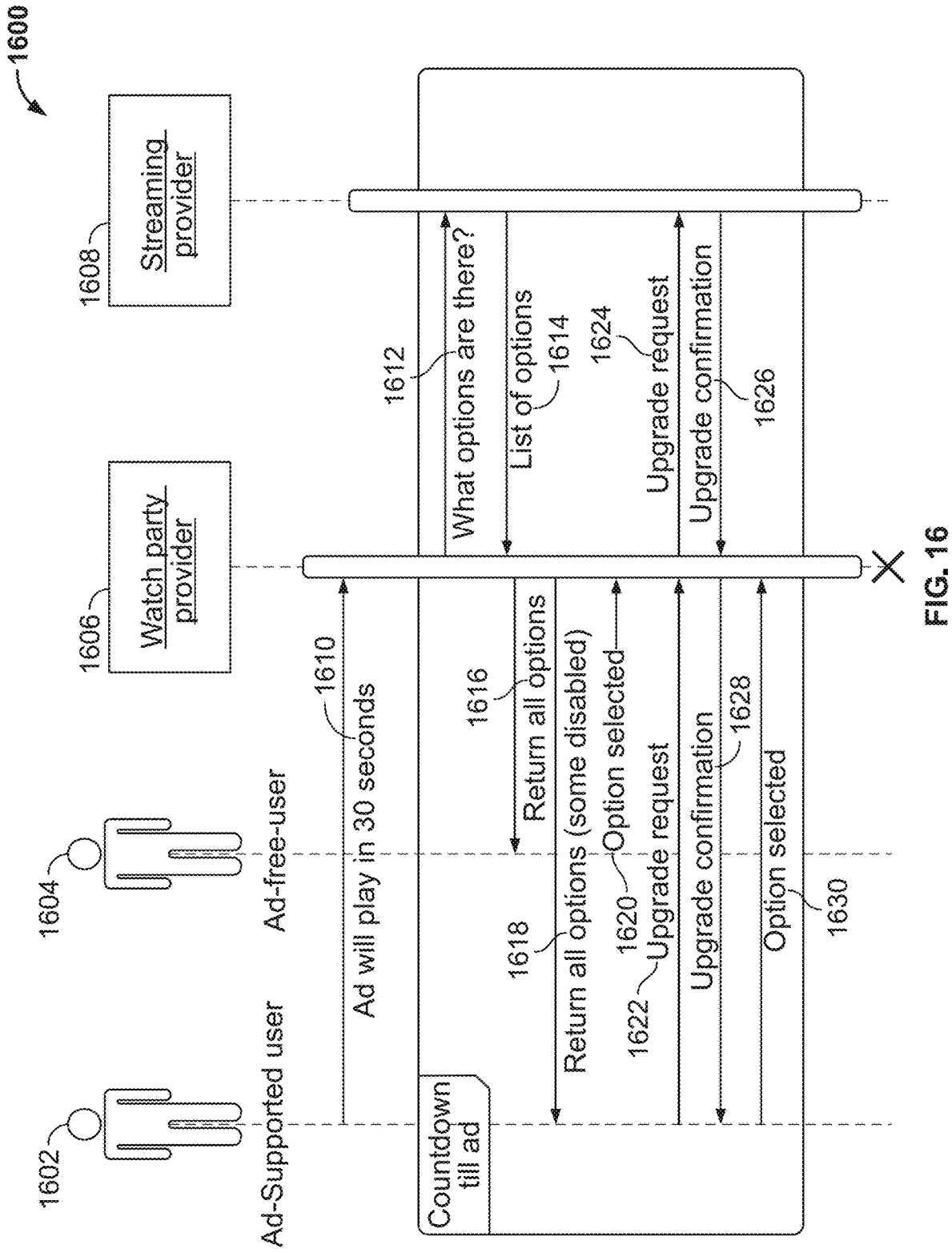
FIG. 16 shows another example process of illustrative steps involved in enabling an enhanced group watch session, in accordance with some embodiments of the disclosure.

FIG. 16 shows an example process including illustrative steps involved in enabling an enhanced group watch session, in accordance with some embodiments of the disclosure. Process 1600 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1600 may be incorporated into or combined with one or more actions of any other process or embodiments described herein.

The environment 1600 comprises an advertisement-supported user 1602, an advertisement-free, or premium, user 1604, a watch party provider 1606 and a streaming provider 1608. In this example, a notification 1610 may be generated for output at a computing device associated with the users 1602, 1604, that indicates that an advertisement will play in 30 seconds. The watch party provider 1606 communicates with the streaming provider 1608 to determine which options are available 1612, i.e., for example, whether an upgrade for the advertisement-supported user 1602 is available, or whether premium content is available for the advertisement-free user 1604 to consume during the advertisement break. At 1614, the streaming provider 1608 returns a list of options 1614 to the watch party provider 1606. The watch party provider 1606 transmits the list of options 1616 to an application associated with the watch party provider at a computing device associated with the advertisement-free user 1604. The watch party provider 1606 also transmits the list of options, with some options disabled 1618, to an application associated with the watch party provider at a computing device associated with the advertisement-supported user 1602. The advertisement-free user 1604 selects an option 1620 at the application, and the option is transmitted to the watch party provider 1606. For example, the option may be to consume premium content during the advertisement break. The advertisement-supported user 1602 chooses to upgrade to an advertisement-free package. The upgrade request 1622 is received at the watch party provider 1606, and the watch party provider 1606 transmits the upgrade request 1624 to the streaming provider 1608. Confirmation 1626 of the upgrade is transmitted to the watch party provider 1606, which then transmits the upgrade confirmation 1628 to the computing device that transmitted the upgrade request, and all options are enabled for the user 1602. On selecting 1630 an option, the option is transmitted to the watch party provider 1606. In some examples, the aforementioned process may be implemented through an application programming interface (API) provided by an OTT provider.

Figure 17:
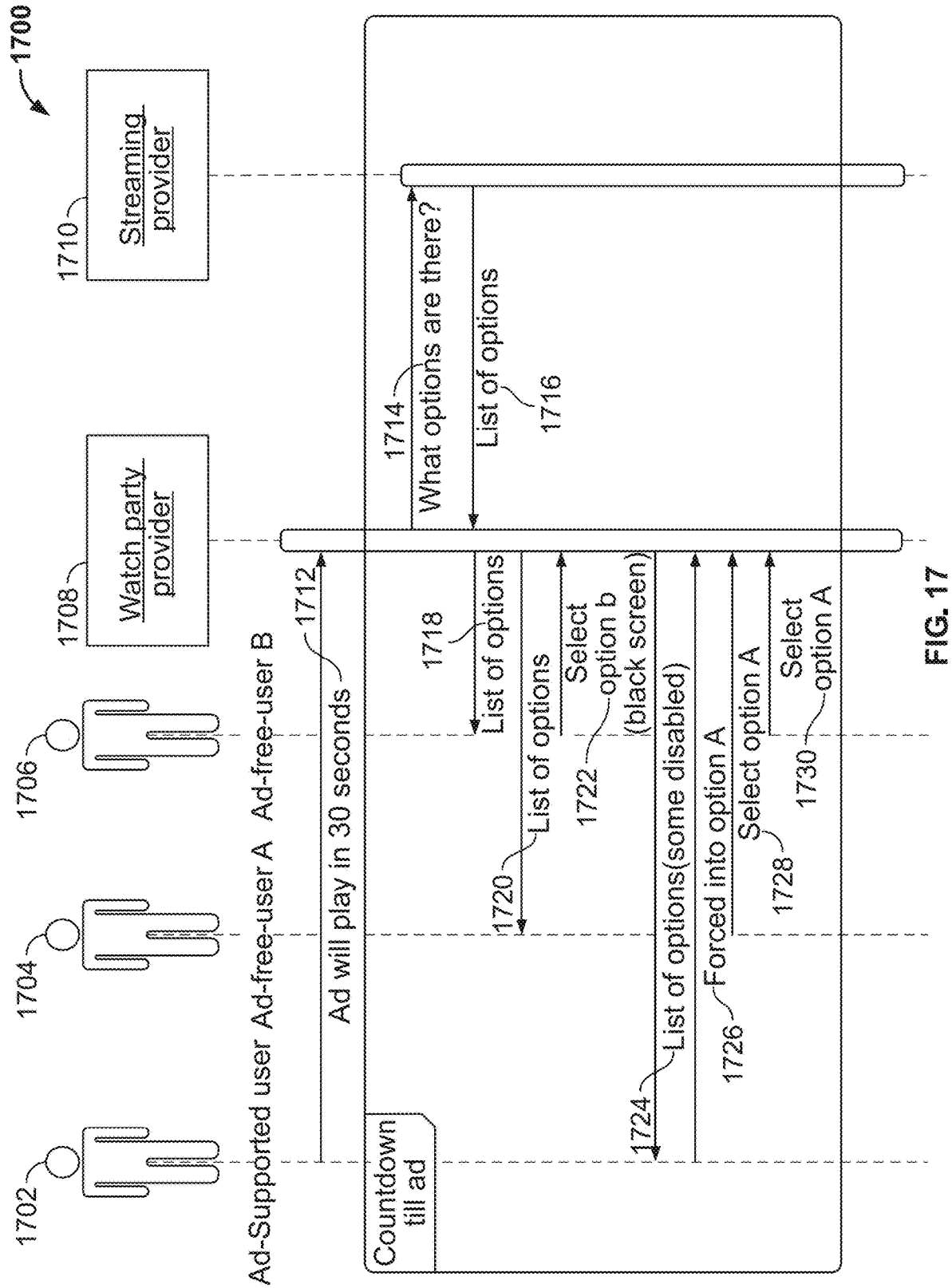
FIG. 17 shows another example process of illustrative steps involved in enabling an enhanced group watch session, in accordance with some embodiments of the disclosure.

FIG. 17 shows an example process including illustrative steps involved in enabling an enhanced group watch session, in accordance with some embodiments of the disclosure. Process 1700 may be implemented, in whole or in part, on any of the aforementioned computing devices (e.g., computing devices 102, 106, 202, 206, 302, 306, 402, 406, 502, 506, e.g., by way of executing one or more instructions or routines stored to memory or storage of a device). In addition, one or more actions of the process 1700 may be incorporated into or combined with one or more actions of any other process or embodiments described herein.

The environment 1700 comprises an advertisement-supported user 1702, a first advertisement-free, or premium, user 1704, a second advertisement-free, or premium, user 1706, a watch party provider 1708 and a streaming provider 1710. In this example, a notification 1712 may be generated for output at a computing device associated with the users 1702, 1704, 1706, that indicates that an advertisement will play in 30 seconds. The watch party provider 1708 communicates with the streaming provider 1710 to determine which options are available 1714, i.e., for example, whether an upgrade for the advertisement-supported user 1702 is available, or whether premium content is available for the advertisement-free users 1704, 1706 to consume during the advertisement break. At 1716, the streaming provider 1710 returns a list of options 1716 to the watch party provider 1708. The watch party provider 1708 transmits the list of options 1718, 1720 to applications associated with the watch party provider at computing devices associated with the advertisement-free users 1704, 1706. In this example, the second advertisement-free user 1706 selects an option that entails displaying a black, or blank, screen at the user's computing device. The selected option 1722 is transmitted to the watch party provider 1708. The watch party provider 1708 also transmits the list of options, with some options disabled 1724, to an application associated with the watch party provider at a computing device associated with the advertisement-supported user 1702. The advertisement-free user must watch 1726 an advertisement due to their package level, and that option 1726 is automatically transmitted to the watch party provider 1708. The first advertisement-free user 1704 chooses an option to watch an advertisement, despite being a premium user, and that option 1728 is transmitted to the watch party provider 1708. The second advertisement-free user 1706 chooses another option, in this case to also watch an advertisement, and that option 1730 is transmitted to the watch party provider 1708.

In some examples, after a user has upgraded to an advertisement-free, or premium, account, stored video on demand sessions of previous watch parties may be accessed, including any sub-chat rooms that the user may have been previously excluded from. In this way, the longer a user remains at the lower-cost ad-supported tier, the more content they have missed out on accrues to act as an incentive to upgrade to a premium OTT package.

In some examples, any of the aforementioned embodiments may be integrated with a streaming, or OTT, provider gifting system, so that members of a group watch session may elevate advertisement-supported members to a premium package in order to prevent the group watch session from being slowed down by advertisements. In some examples, such a gift may be for the duration of the current group watch session, or in other examples, may be for a more permanent duration.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   initiating, between a first computing device and a second computing device, a group session for consuming a first media content item;
   receiving, at the first computing device and the second computing device, a first portion of the first media content item;
   identifying, based on a first user profile, that the first computing device is configured to receive a second media content item including an advertisement at a first time and that the first user profile is subscribed to a media package comprising one or more advertisements;
   identifying, based on a second user profile, that the second computing device is configured to not receive the second media content item at the first time and that the second user profile is subscribed to a premium media package;
   identifying a third computing device, wherein the third computing device is associated with the second user profile;
   generating, for output, a first user interface element associated with performing an action;
   receiving a first input associated with the first user interface element;
   performing, at the second computing device, the action;
   generating, for output at the third computing device, a second user interface element associated with upgrading the first user profile to the premium media package;

receiving a second input associated with the second user interface element associated with upgrading the first user profile to the premium media package;

upgrading the first user profile to the premium media package;

receiving, at the first computing device a second portion of the first media content item in place of the advertisement; and receiving, at the second computing device, the second portion of the first media content item.

2. The method of claim 1, wherein the action comprises generating no media content for output, generating the second media content item for output, requesting a third media content item, and/or generating an interactive media item for output.

3. The method of claim 1, further comprising:
generating, for output at the first and second computing devices, a user interface associated with a first chat room, wherein the user interface and the first media content item are generated for concurrent output; and, in response to receiving the second media content item at the first computing device:
moving the first computing device from the first chat room to a second chat room.

4. The method of claim 1, further comprising:
collecting one or more metrics at the first computing device and/or the second computing device; and
transmitting the collected metrics from the first computing device and/or the second computing device to a server associated with a provider of the first media content item.

5. The method of claim 1, wherein:
the method further comprises identifying a fourth computing device, wherein the fourth computing device is associated with the second user profile; and
generating the first user interface element associated with performing an action further comprises generating the first user interface element for output at the fourth computing device.

6. The method of claim 1, wherein:
identifying that the first computing device is configured to receive the second media content item at the first time further comprises identifying that the first user profile is subscribed to a media package comprising one or more advertisements;
identifying that the second computing device is configured to not receive the second media content item at the first time further comprises identifying that the second user profile is subscribed to the premium media package; and
the action comprises upgrading the first user profile from the media package comprising one or more advertisements to the premium media package.

7. The method of claim 1, further comprising:
identifying a time period associated with the second media content item; and
limiting the duration of the action to the identified time period.

8. The method of claim 1, wherein upgrading the first user profile to the premium media package further comprises receiving an updated manifest file at the first computing device.

9. A system comprising:
input circuitry configured to receive an input for initiating, between a first computing device and a second computing device, a group session for consuming a first media content item;

control circuitry configured to:
receive, at the first computing device and the second computing device, a first portion of the first media content item;
identify, based on a first user profile, that the first computing device is configured to receive a second media content item including an advertisement at a first time and that the first user profile is subscribed to a media package comprising one or more advertisements;
identify, based on a second user profile, that the second computing device is configured to not receive the second media content item at the first time and that the second user profile is subscribed to a premium media package;
identify a third computing device, wherein the third computing device is associated with the second user profile;
generate, for output, a first user interface element associated with performing an action;
receive a first input associated with the first user interface element;
perform, at the second computing device, the action;
generate, for output at the third computing device, a second user interface element associated with upgrading the first user profile to the premium media package;
receive a second input associated with the second user interface element associated with upgrading the first user profile to the premium media package;
upgrade the first user profile to the premium media package;
receive, at the first computing device a second portion of the first media content item in place of the advertisement; and
receive, at the second computing device, the second portion of the first media content item.

10. The system of claim 9, wherein the action comprises generating no media content for output, generating the second media content item for output, requesting a third media content item, and/or generating an interactive media item for output.

11. The system of claim 9, wherein the control circuitry is further configured to:
generate, for output at the first and second computing devices, a user interface associated with a first chat room, wherein the user interface and the first media content item are generated for concurrent output; and, in response to receiving the second media content item at the first computing device:
move the first computing device from the first chat room to a second chat room.

12. The system of claim 9, wherein the system is further configured to:
collect one or more metrics at the first computing device and/or the second computing device; and
transmit the collected metrics from the first computing device and/or the second computing device to a server associated with a provider of the first media content item.

13. The system of claim 9, wherein:
the control circuitry is further configured to identify a fourth computing device, wherein the fourth computing device is associated with the second user profile; and
the control circuitry configured to generate the first user interface element associated with performing an action is configured to generate the first user interface element by generating the first user interface element for output at the fourth computing device.

14. The system of claim 9, wherein:
the control circuitry configured to identify that the first computing device is configured to receive the second media content item at the first time is configured to identify that the first computing device is configured to receive the second media content item by identifying that the first user profile is subscribed to a media package comprising one or more advertisements;

the control circuitry configured to identify that the second computing device is configured to not receive the second media content item at the first time is configured to identify that the second computing device is configured to not receive the second media content item by identifying that the second user profile is subscribed to the premium media package; and the action comprises upgrading the first user profile from the media package comprising one or more advertisements to the premium media package.

15. The system of claim 9, wherein the control circuitry is further configured to:
identify a time period associated with the second media content item; and
limit the duration of the action to the identified time period.

16. The system of claim 9, wherein the control circuitry configured to upgrade the first user profile to the premium media package is configured to upgrade the first user profile by receiving an updated manifest file at the first computing device.

* * * * *